United States Patent
Barton et al.

(10) Patent No.: US 9,319,783 B1
(45) Date of Patent: Apr. 19, 2016

(54) ATTENUATION OF OUTPUT AUDIO BASED ON RESIDUAL ECHO

(71) Applicant: Amazon Technologies, Inc., Reno, NV (US)

(72) Inventors: William Folwell Barton, Harvard, WA (US); Amit Chhetri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 14/184,336

(22) Filed: Feb. 19, 2014

(51) Int. Cl.
*H04B 3/20* (2006.01)
*H04B 15/00* (2006.01)
*H04R 3/00* (2006.01)
*G10L 21/0208* (2013.01)
*H04M 9/08* (2006.01)

(52) U.S. Cl.
CPC ............ *H04R 3/002* (2013.01); *G10L 21/0208* (2013.01); *H04M 9/082* (2013.01)

(58) Field of Classification Search
None
See application file for complete search history.

(56) References Cited

U.S. PATENT DOCUMENTS

| | | | |
|---|---|---|---|
| 2011/0135105 A1* | 6/2011 | Yano | H04M 9/082 381/66 |
| 2014/0105410 A1* | 4/2014 | Zhan | G10K 11/175 381/66 |
| 2014/0307882 A1* | 10/2014 | LeBlanc | H04S 7/305 381/66 |

* cited by examiner

*Primary Examiner* — Regina N Holder
(74) *Attorney, Agent, or Firm* — Knobbe Martens Olson & Bear, LLP

(57) ABSTRACT

Residual echo that remains after an echo cancellation process may interfere with speech recognition. If near-end speech is detected in an audio input signal, a controller may attenuate the audio playback signal. Too much attenuation may disturb playback, whereas too little attenuation may not improve speech recognition. Accordingly, features are disclosed for attenuating an audio playback signal based at least in part on residual echo level.

24 Claims, 4 Drawing Sheets

ATTENUATION OF OUTPUT AUDIO BASED ON RESIDUAL ECHO

BACKGROUND

A device for audio-based communication, including a voice-controlled audio playback system, typically includes both a loudspeaker and a microphone. The loudspeaker may used to play back audio signals received from a remote ("far-end") source, while the microphone is used to capture audio signals from a local ("near-end") source. In the case of a voice-controlled audio playback system, for example, the far-end source may include video content from a network source or a disk, and the near-end source may include a viewer's speech commands. As another example, in the case of a telephone call, the near- and far-end sources may be people engaged in a conversation, and the audio signals may contain speech. An acoustic echo occurs when the far-end signal emitted by the loudspeaker is captured by the microphone, after undergoing reflections in the local environment.

An acoustic echo canceller ("AEC") may be used to remove acoustic echo from an audio signal captured by a microphone in order to facilitate improved communication. For example, the AEC may filter the microphone signal by determining an estimate of the acoustic echo (e.g., the remote audio signal emitted from the loudspeaker and reflected in the local environment). The AEC can then subtract the estimate from the microphone signal to produce an approximation of the true local signal (e.g., the user's utterance). The estimate can be obtained by applying a transformation to a reference signal that corresponds to the remote signal emitted from the loudspeaker. In addition, the transformation can be implemented using an adaptive algorithm. For example, adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC to can adapt its echo estimates to the local environment in which it operates.

In addition, communication devices may also include a residual echo suppressor ("RES"). Various factors, including nonlinearity and noise, can cause an echo to not be completely eliminated by an acoustic echo canceller. A residual echo suppressor may be used to further reduce the level of echo that remains after processing by an acoustic echo canceller. For example, residual echo suppressors may use non-linear processing to further reduce the echo level. However, even after processing by a residual echo suppressor, some residual echo may remain.

Residual echo that remains after an echo cancellation process may interfere with speech recognition. For example, when "double talk" is present, a microphone signal will include both the near-end speech signal and the acoustic echo. If the residual echo is too large relative to the speech signal, recognition of the near-end speech may be difficult.

If near-end speech is detected in an audio input signal, a controller may attenuate the audio playback signal in order to reduce the residual echo that may interfere with speech recognition. For example, when near-end speech is detected, the controller may attenuate the audio playback signal by a fixed amount (e.g., by N dB). However, if the attenuation amount is too great, the disruption to the playback signal may be noticeable to the listener. If the attenuation amount is too small, the remaining residual echo may continue to interfere with speech recognition.

Alternatively, when near-end speech is detected, the controller may attenuate the audio playback signal to a fixed target level. However, similar problems may result. If the target level for the audio playback signal is too low, the disruption to the playback signal may be noticeable to the listener. If the target level for the audio playback signal is too high, the remaining residual echo may continue to interfere with speech recognition.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to attenuating an audio playback signal based at least in part on residual echo level. Controlling the level of attenuation of the audio playback signal based on residual echo level allows for attenuation to be increased when more residual echo is present. As the attenuation of the playback signal is increased, the residual echo can be reduced, and recognition of user speech may be improved. In addition, controlling the level of attenuation of the audio playback signal based on residual echo level allows for attenuation to be reduced when less residual echo is present. If less residual echo is present, less or no attenuation of the audio playback signal may be needed in order to achieve reliable speech recognition. Less attenuation can provide less disruption of the playback signal to the listener.

According to aspects of the disclosure, a near-end audio input signal may be received. Echo cancellation, which may include acoustic echo cancellation and/or residual echo suppression, may be performed on the audio input signal using a set of acoustic echo cancellation parameters to generate an echo-reduced signal. However, the echo-reduced signal may include a residual echo. If near-end speech is determined to be present in the audio input signal, an audio playback signal may be attenuated based at least in part on at least one of the residual echo and the echo cancellation parameters. For example, in some embodiments, the audio playback signal may be attenuated by an amount proportional to an energy level of the residual echo. In addition, the audio playback signal may be attenuated by an amount such that the residual echo is less than a threshold. In other embodiments, the audio playback signal may be attenuated by an amount proportional to a sum of the squares of the echo cancellation parameters.

Additional aspects of the disclosure may relate to selectively attenuating frequencies of the audio playback signal based on spectral information of the near-end speech. For example, if spectral information of a user's speech is known, attenuation of the playback signal at the frequencies that overlap with the user's speech may be greater than the attenuation of other frequencies. In addition, aspects of the disclosure may relate to selectively attenuating frequencies of the audio playback signal based on acoustic properties of the speaker. For example, a speaker's reproduction of low frequencies may be known to introduce more residual echo than the speaker's reproduction of higher frequencies. So, low frequencies in the playback signal may be attenuated more than higher frequencies.

Figure 1:
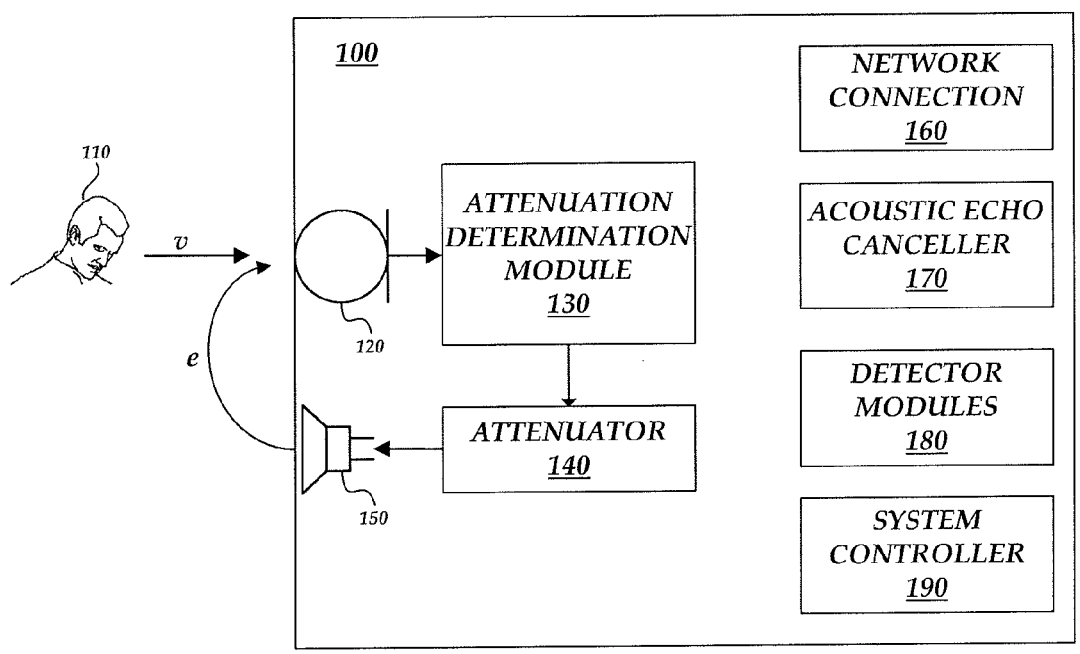
FIG. 1 is a block diagram illustrating components of some communication systems that include an attenuation determination module.

FIG. 1 shows an example of a communication system 100. Communication system 100 may be implemented in hardware and/or software using techniques known to persons of skill in the art. For example, communication system 100 may be implemented by a single telecommunication device, including a mobile phone, or by a combination of several devices such as a mobile computing device and a network-accessible server.

FIG. 1 shows components that may appear in communication system 100, including a microphone 120, an attenuation determination module 130, an attenuator 140, and a loudspeaker 150. The microphone 120 of communication device 100 generally detects sound from at least two sources when generating an audio input signal. For example, when user 110 speaks an utterance, the user's voice v is detected by the microphone 120. In addition, the speaker 150 produces sound based on an audio playback signal, creating an acoustic echo e that is detected by the microphone 110. Thus, an audio input signal detected by the microphone 120 includes components attributable to the user's voice v and the acoustic echo e.

The attenuation determination module 130 may receive an audio input signal from the microphone 110. Generally, the attenuation determination module 130 determines an attenuation amount for the audio playback signal, which reduces the volume of the acoustic echo e. For example, as described below with respect to FIGS. 2-4, the attenuation determination module 130 may determine an attenuation amount for the audio playback signal based at least in part on a level of residual echo or echo cancellation parameters. In addition, the attenuation determination module 130 may determine an attenuation amount for the audio playback signal based on other processing parameters. The attenuator 120 may attenuate the audio playback signal based on the attenuation amount.

The communication system 100 also may include other modules. For example, the communication system 100 may include a network connection 160, an acoustic echo canceller 170, detector modules 180, and a system controller 190. In some embodiments, the system controller 190 may comprise the attenuation determination module 130.

Network connection 160 may be used to send and receive communication signals over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

The communication signals that are sent and received by network connection 160 may include a far-end playback signal, which may be emitted from loudspeaker 150, and an AEC output signal, produced by acoustic echo canceller 170. The AEC output signal may be determined by adaptively filtering a signal from microphone 120. For the sake of simplicity, microphone 120 is referred to herein as a single component. However, in some embodiments, multiple microphones may be used together and an AEC system (or portions of an AEC system) may be provided for each one. Additional aspects of AEC 170 are described below, with respect to FIGS. 2 and 3.

Figure 2:
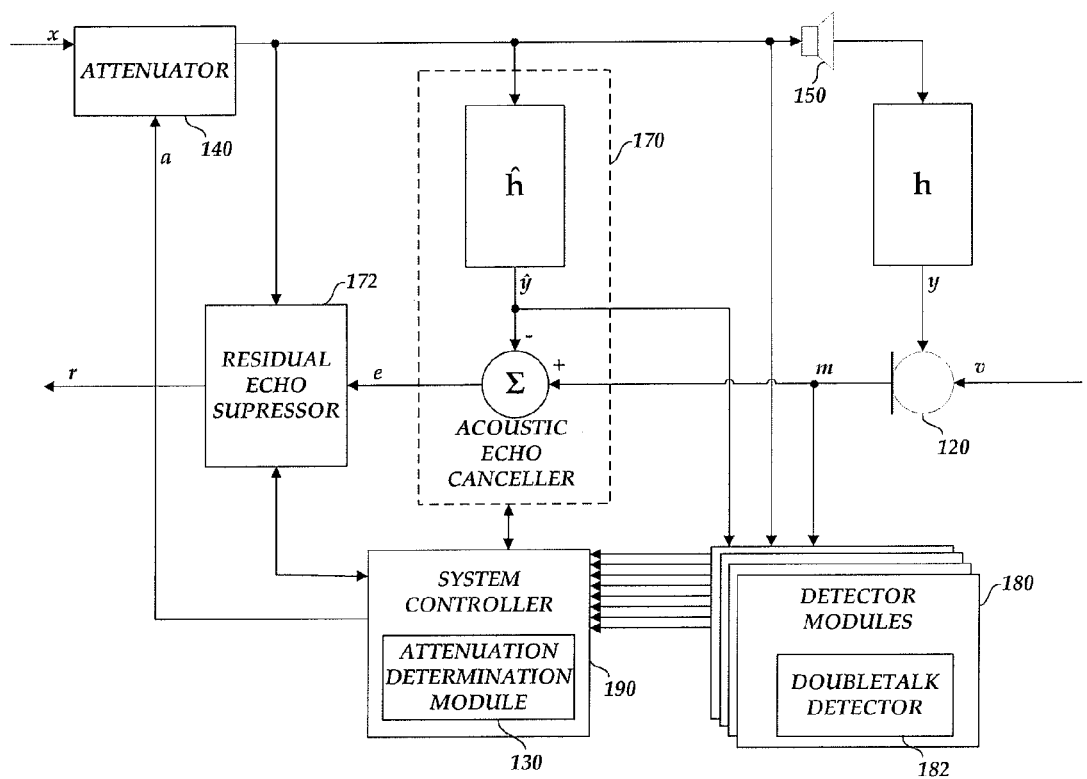
FIG. 2 is a signal diagram depicting the relationships between various signals that are used to perform echo cancellation and attenuation of a playback signal according to an embodiment.

FIG. 2 is a signal diagram that illustrates the relationships between various signals and components that are relevant to acoustic echo cancellation. Certain components of FIG. 2 correspond to components from FIG. 1, and retain the same numbering. These components include microphone 120, attenuation determination module 130, attenuator 140, loudspeaker 150, acoustic echo canceller 170, detector modules 180, and system controller 190. The signals depicted in FIG. 2 include far-end playback signal x, acoustic echo y, near-end signal v, microphone signal m, estimated echo $\hat{y}$, AEC output e, and residual echo suppressor output r. FIG. 2 also depicts acoustic transfer function h and estimated acoustic transfer function $\hat{h}$.

In the example of FIG. 2, acoustic echo may occur as follows. Far-end playback signal x is emitted from loudspeaker 150 and undergoes various reflections in the local environment according to acoustic transfer function h, yielding acoustic echo y. Microphone 120 captures both acoustic echo y and near-end signal v, which together produce microphone signal m. The presence of acoustic echo y in microphone signal m may interfere with voice recognition of near-end signal v. Accordingly, it may be desirable to filter microphone signal m in order to remove acoustic echo y, to the extent that such removal is possible. However, to the extent that a residual echo remains, it may be desirable to send an attenuation signal a to attenuator 140. The amount of attenuation may be based on the residual echo, as described in further detail below.

AEC 170 may be configured to filter microphone signal m in the following manner. First, AEC 170 may apply estimated transfer function h to far-end signal x, yielding estimated echo $\hat{y}$. Estimated echo $\hat{y}$ may be subtracted from microphone signal m, producing an echo-reduced signal AEC output e. AEC output e is an estimate of the near-end signal v, and if AEC 170 is functioning properly then the content of near-end signal v will be more easily discerned from AEC output e than from microphone signal m. However, AEC output e may include an initial residual echo.

As described above, AEC 170 relies on estimated echo $\hat{y}$, which in turn relies on estimated transfer function $\hat{h}$. The estimation of transfer function $\hat{h}$ may be adaptive. For example, a set of acoustic echo cancellation coefficients of the transfer function may be adjusted automatically and continuously by a feedback loop. System controller 190 may determine adjustments to the rate of adaptation used in the feedback loop, and may also directly adjust the values of the coefficients used in transfer function h under certain circumstances.

In addition, a residual echo suppressor 172 may optionally be used to further reduce the level of residual echo that remains after processing by AEC 170. For example, the residual echo suppressor 172 may receive the echo-reduced signal of the AEC output e. The residual echo suppressor 172 may perform residual echo suppression on the echo-reduced signal using a set of residual echo suppression parameters to generate a residual-echo-reduced signal r. The residual-echo-reduced signal r may include a reduced residual echo.

Detector modules 180 perform various calculations to recognize relevant signal conditions. In particular, detector modules 180 may include a doubletalk detector 182 configured to detect near-end speech in an audio input signal. Detector modules 180 also may be configured to detect other signal conditions, including echo path change, along with anomalies and inactivity in the microphone and loudspeaker signals.

Doubletalk detector 182 may determine a doubletalk condition based on any doubletalk detection method. For example, in some embodiments, doubletalk detector 182 may determine a doubletalk condition based on analysis of signal parameters, including analysis of at least one of the microphone signal m, playback signal x, estimated echo ŷ. In other embodiments, a user 110 may manually indicate a doubletalk condition. For example, a user 110 may press a button, or any other kind of switch, on the communication device 100 to indicate a doubletalk condition, such as when a user desires to provide a speech command.

The AEC 170, residual echo suppressor 172, detector modules 180, and system controller 190 may process the signals on a frame-by-frame basis. For example, a frame may represent a sequence of discrete signal samples. In some embodiments, the frame is 8-10 milliseconds long. For each frame, the detector modules process the sequence of signal samples within the frame to compute various signal characteristics. In some cases, the computed characteristics may also depend in part on samples from previous frames. Once the end of the frame is reached, the computed characteristics are used to determine the output of each detector module.

Signal samples may be indexed by discrete sample index n, with each sample representing the state of the signal at a particular point in time. Thus, for example, the signal e may be represented by a sequence of samples e(0), e(1), . . . e(n). In this example the index n corresponds to the most recent point in time for which a sample is available. In addition, calculations involving various signals may be expressed using the sample index n. For example, the value of e at time n may be determined by the equation $e(n)=m(n)-\hat{y}(n)$.

In some cases, the value of one signal at time n may depend on values of one or more other signals at several points in time. For example, that the value of estimated echo ŷ depends on the value of the far-end signal x, as follows:

$$\hat{y}(n)=\hat{h}(n)*x(n),$$

where '*' denotes the convolution operation. The value of the estimated transfer function $\hat{h}(n)$ at time n may be defined to depend on the value of the input signal at several points in time. Using x as the input signal, the value of the convolution of $\hat{h}$ and x at time n may be calculated this way:

$$\hat{h}(n)*x(n)=\hat{h}_0(n)x(n)+\hat{h}_1(n)x(n-1)+\ldots+\hat{h}_L(n)x(n-L)$$

Combining the last two equations, it can be seen that the value of y at time n depends on the value of x at times n, n−1, . . . , n−L:

$$\hat{y}(n)=\hat{h}_0(n)x(n)+\hat{h}_1(n)x(n-1)+\ldots+\hat{h}_L(n)x(n-L)$$

Thus, the value of a particular signal at one point in time may be calculated from values of other signals at multiple points in time.

In the foregoing example, the estimated transfer function $\hat{h}$ is defined by a set of coefficients $\hat{h}_0, \hat{h}_1, \ldots, \hat{h}_L$. These are the set of the acoustic echo cancellation coefficients of the AEC, which may be adjusted continuously in order to improve the estimated echo ŷ converge on the actual echo y. However, residual echo may remain after processing by the AEC 170 and/or residual echo suppressor 172, which may interfere with speech recognition.

When detector modules 180 detect near-end speech in microphone signal m, the system controller 190 may send an attenuation signal a to the attenuator 140 that is based on the residual echo. In particular, the attenuation signal a may be based on any echo information of the AEC 170 and/or the residual echo suppressor 172, including at least one or more of the initial residual echo, the acoustic echo cancellation coefficients of the AEC 170, the reduced residual echo, and the residual echo suppression parameters of the residual echo suppressor 172.

In some embodiments, the attenuator 140 may be configured to attenuate the audio playback signal x by an amount proportional to an energy level of the residual echo. For example, the system controller 172 may determine the RMS energy level of the initial residual echo present in the AEC output e. If a residual echo processor 172 is used to further process the AEC output e, the system controller 172 may also determine the RMS energy level of the reduced residual echo present in the residual echo suppressor output r. The system controller 190 may instruct the attenuator 140 to attenuate the audio playback signal x by an amount proportional to the RMS energy level of the initial residual echo present in the AEC output e, the RMS energy level of the reduced residual echo present in the residual echo suppressor output r, or some function of the two. By setting an attenuation amount to be proportional to the residual echo, the audio playback signal x is only attenuated to the extent needed, thereby minimizing disruption to the audio playback signal x while facilitating improved speech recognition.

In some embodiments, the attenuator 140 may be configured to attenuate the audio playback signal x by an amount such that the residual echo is less than a threshold. For example, it may be found that speech recognition is improved when the residual echo is less than a particular threshold. So, an attenuation amount may be set to an amount to ensure that the residual echo will be less than the threshold. A different threshold may be set for the initial residual echo present in the AEC output e and the reduced residual echo present in the residual echo suppressor output r. The system controller 190 may set the attenuation amount such that either one or both of the thresholds are met.

In other embodiments, the audio playback signal may be attenuated by an amount based on the echo cancellation parameters. For example, the audio playback signal may be attenuated by an amount proportional to a sum of the squares of the echo cancellation parameters, such as the set of coefficients $\hat{h}_0, \hat{h}_1, \ldots, \hat{h}_L$ of the AEC 170. In addition, the audio playback signal may be attenuated by an amount based on the residual echo suppression parameters of the residual echo suppressor 172. In general, the audio playback signal may be attenuated by an amount based on any function of any of the initial residual echo, the acoustic echo cancellation coefficients, the reduced residual echo, and the residual echo suppression parameters.

In general, in addition to attenuating the amplitude of the audio playback signal x, the attenuator 140 also may be configured to shape the spectral components of the audio playback signal x. For example, in some embodiments, the attenuator 140 may be configured to attenuate some frequencies of the audio playback signal x more than other frequencies. In other embodiments, the attenuator 140 may be configured to attenuate each frequency of the audio playback signal x equally.

In some embodiments, the system controller 190 may be configured to instruct the attenuator 140 to selectively attenuate frequencies of the audio playback signal x based on spectral information of the near-end speech. For example, if spectral information of a user's speech is known, attenuation of the playback signal at the frequencies that overlap with the user's speech may be greater than the attenuation of other frequencies. By selectively attenuating the frequencies in the playback signal x that overlap with a user's speech, residual echo caused by the playback signal may interfere less with speech recognition.

In some embodiments, the system controller 190 may be configured to selectively attenuate some frequencies and boost other frequencies so that the overall volume of the playback signal x remains substantially the same. For example, if the system controller is selectively attenuating the frequencies in the playback signal x that overlap with a user's speech, the system controller may boost non-speech frequencies in the playback signal x such that the overall volume of the playback signal x remains substantially the same.

In some embodiments, the system controller 190 may be configured to instruct the attenuator 140 to selectively attenuate frequencies of the audio playback signal x based on default spectral information of an average user's speech. In other embodiments, the system controller 190 may be configured to instruct the attenuator 140 to selectively attenuate frequencies of the audio playback signal x based on the spectral information of the particular user's speech. In addition, the system controller 190 may be configured to recognize different users. The system controller 190 may be configured to store an acoustic profile of each recognized user in a memory.

In addition, the system controller 190 may be configured to instruct the attenuator 140 to selectively attenuate frequencies of the audio playback signal x based on acoustic properties of the speaker. For example, a speaker's reproduction of low frequencies may be known to introduce more residual echo than the speaker's reproduction of higher frequencies. So, low frequencies in the playback signal may be attenuated more than higher frequencies.

Also, in some embodiments, the system controller 190 may be configured to instruct the attenuator 140 to selectively attenuate only those frequencies of the audio playback signal x that are below a threshold. For example, the system controller 190 may be configured to attenuate only frequencies in the audio playback signal x that are below the threshold 5 kHz.

The signals described above are illustrative, and an AEC system may include a variety of additional signals beyond those depicted in FIG. 2 without departing from the inventive concepts described herein. For example, detector modules 180 and system controller 190 may use additional or different input signals apart from those depicted in FIG. 2 in order to perform the detection and control operations described above and below.

Process for Attenuating Audio Playback Signal

Figure 3:
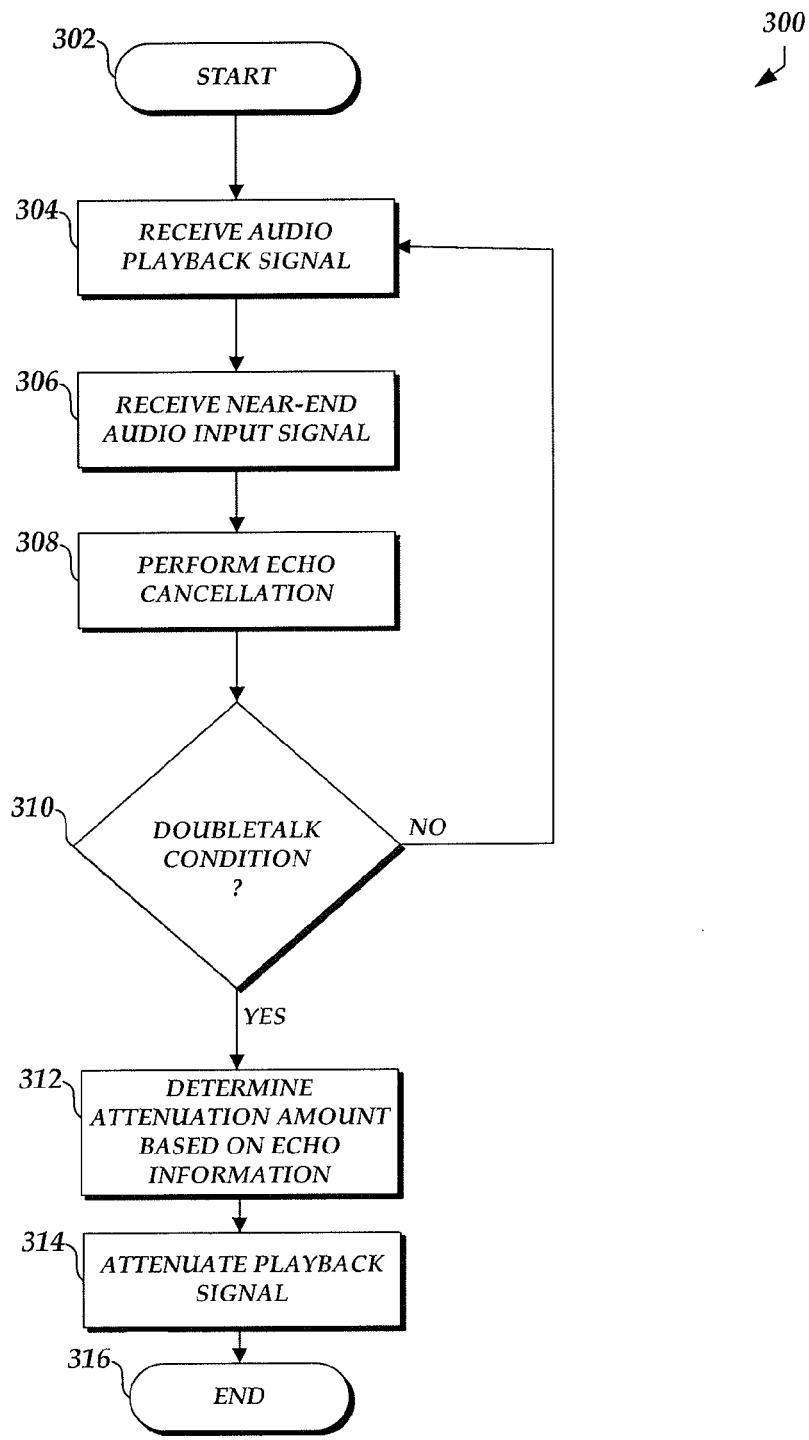
FIG. 3 is a flow diagram of an illustrative process for attenuating an audio playback signal based on a residual echo level according to an embodiment.

With reference now to FIG. 3, an example process 300 for attenuating an audio playback signal based on a residual echo level according to an embodiment will be described. The process 300 begins at block 302. The process 300 may be embodied in hardware, a set of executable program instructions, or a combination of hardware and executable program instructions. The process 300 may be performed, for example, by the AEC 170, residual echo suppressor 172, detector modules 180, doubletalk detector 182, system controller 190, attenuation determination module 130, and attenuator 140 of FIG. 2. Although the process 300 of FIG. 3 will be described with respect to the components of FIG. 2, the process 300 is not limited to implementation by, or in conjunction with, any specific component shown in FIG. 2. In some embodiments, the process 300, or some variant thereof, may be implemented by alternative components, by the components of FIG. 2 in a different configuration, etc.

At block 304, an audio playback signal x is received. For example, the audio playback signal x may be received by the attenuator 140. If no near-end speech is detected, the attenuator 140 may simply pass the audio playback signal x to the speaker 150.

At block 306, a near-end audio input signal is received. For example, the near-end audio input signal may be the microphone signal m received by the microphone 120. Alternatively, the near-end audio input signal may be received after pre-processing of the microphone signal m, such as a noise reduction step.

At block 308, echo cancellation is performed. For example, the AEC 170 may perform acoustic echo cancellation on the audio input signal using the set of acoustic echo cancellation coefficients to generate an echo-reduced signal, which includes an initial residual echo. The echo cancellation performed at block 308 may optionally include residual echo suppression. For example, residual echo suppressor 172 may perform residual echo suppression on the echo-reduced signal using a set of residual echo suppression parameters to generate a residual-echo-reduced signal, which may include a reduced residual echo.

At block 310, detector modules 180 detect whether a doubletalk condition is present. In particular, doubletalk detector 182 may detect whether near-end speech is present in the audio input signal. If not, the playback signal does not need to be attenuated, and the process may continue back to block 304 to receive the audio playback signal x. If near-end speech is detected, the doubletalk detector 182 informs the system controller 190, and the process proceeds to block 312 to attenuate the playback signal x.

At block 312, an attenuation amount for the audio playback signal x may be determined based on echo information. For example, the system controller 190 may determine an attenuation amount that is based on any echo information of the AEC 170 and/or the residual echo suppressor 172, including at least one or more of the initial residual echo, the acoustic echo cancellation coefficients of the AEC 170, the reduced residual echo, and the residual echo suppression parameters of the residual echo suppressor 172. In some embodiments, the attenuation amount may be determined so that the attenuator 140 attenuates the audio playback signal x by an amount proportional to an energy level of the residual echo (e.g., the initial residual echo and/or the reduced residual echo). In addition, the attenuation amount may be determined so that the attenuator 140 attenuates the audio playback signal x by an amount such that the residual echo is less than a threshold. Also, the audio playback signal may be attenuated by an amount based on the echo cancellation parameters. For example, the audio playback signal may be attenuated by an amount proportional to a sum of the squares of the echo cancellation parameters, such as the set of coefficients $\hat{h}_0, \hat{h}_1, \ldots, \hat{h}_L$ of the AEC 170.

At block 312, determination of the attenuation amount of the playback signal x may include determination of shaping of the spectral components of the audio playback signal x. For example, in some embodiments, the system controller 190 may be configured to instruct the attenuator 140 to selectively attenuate frequencies of the audio playback signal x based on spectral information of the near-end speech. In addition, the system controller 190 may be configured to instruct the attenuator 140 to selectively attenuate frequencies of the audio playback signal x based on acoustic properties of the speaker.

At block 314, the audio playback signal x may be attenuated based on the attenuation amount. For example, the system controller 190 may send an attenuation signal a to the attenuator 140 that is based on the determined attenuation amount.

Attenuation may be applied to the playback signal during the period of time in which near-end speech is detected. After near end speech is no longer detected in the audio input signal, the process 300 may end at block 316.

Figure 4:
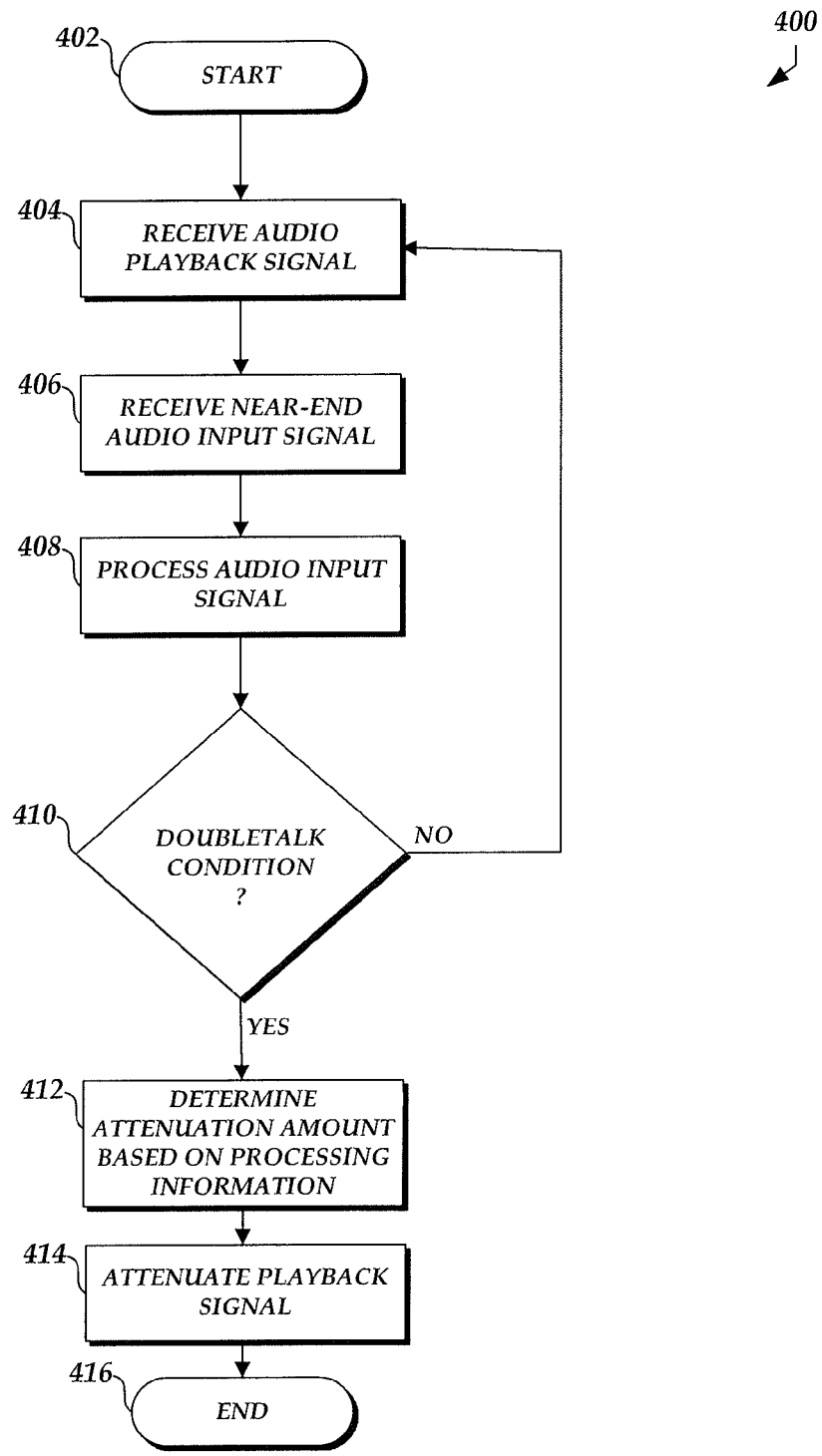
FIG. 4 is a flow diagram of an illustrative process for attenuating an audio playback signal based on a processing information according to an embodiment.

With reference now to FIG. 4, another example process 400 for attenuating an audio playback signal based on processing information according to an embodiment will be described. The process 400 begins at block 402. The process 400 may be embodied in hardware, a set of executable program instructions, or a combination of hardware and executable program instructions. The process 400 may be performed, for example, by the AEC 170, residual echo suppressor 172, detector modules 180, doubletalk detector 182, system controller 190, attenuation determination module 130, and attenuator 140 of FIG. 2. Although the process 400 of FIG. 4 will be described with respect to the components of FIG. 2, the process 400 is not limited to implementation by, or in conjunction with, any specific component shown in FIG. 2. In some embodiments, the process 400, or some variant thereof, may be implemented by alternative components, by the components of FIG. 2 in a different configuration, etc.

At block 404, an audio playback signal x is received. For example, the audio playback signal x may be received by the attenuator 140. If no near-end speech is detected, the attenuator 140 may simply pass the audio playback signal x to the speaker 150.

At block 406, a near-end audio input signal is received. For example, the near-end audio input signal may be the microphone signal m received by the microphone 120. Alternatively, the near-end audio input signal may be received after pre-processing of the microphone signal m, such as a noise reduction step.

At block 408, the audio input signal is processed. For example, the audio input signal may be processed by the AEC 170 and/or residual echo suppressor 172, or by other processing modules. In general, the audio input signal may be processed using a set of processing parameters to generate a processed signal.

At block 410, doubletalk detector 182 detects whether a doubletalk condition is present. For example, doubletalk detector 182 may detect whether near-end speech is present in the audio input signal. If not, the playback signal does not need to be attenuated, and the process may continue back to block 404 to receive the audio playback signal x. If near-end speech is detected, the doubletalk detector 182 informs the system controller 190, and the process proceeds to block 412 to attenuate the playback signal x.

At block 412, an attenuation amount for the audio playback signal x may be determined based on processing information. For example, the system controller 190 may determine an attenuation amount that is based on any processing information of the AEC 170 and/or residual echo suppressor 172, and/or other processing modules, including at least one of the set of processing parameters.

At block 414, the audio playback signal x may be attenuated based on the attenuation amount. For example, the system controller 190 may send an attenuation signal a to the attenuator 140 that is based on the determined attenuation amount.

Attenuation may be applied to the playback signal during the period of time in which near-end speech is detected. After near end speech is no longer detected in the audio input signal, the process 400 may end at block 416.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    a speaker configured to produce sound based on an audio playback signal;
    a microphone configured to detect the produced sound as an audio input signal;
    one or more processors in communication with the speaker and the microphone, the one or more processors configured to:
        perform acoustic echo cancellation on the audio input signal using a set of acoustic echo cancellation coefficients to generate an echo-reduced signal, the echo-reduced signal comprising an initial residual echo;
        perform residual echo suppression on the echo-reduced signal using a set of residual echo suppression parameters to generate a residual-echo-reduced signal, the residual-echo-reduced signal comprising a reduced residual echo;
        determine that near-end speech is present in the audio input signal;
        determine an attenuation amount for the audio playback signal based at least in part on at least one of the initial residual echo, the acoustic echo cancellation coefficients, the reduced residual echo, or the residual echo suppression parameters; and
        attenuate the audio playback signal based on the attenuation amount, wherein the one or more processors are further configured to attenuate the audio playback signal by:
            determining spectral information corresponding to the audio input signal;
            determining, based at least in part on the spectral information, a first portion of the audio playback signal associated with speech and a second portion of the audio playback signal not associated with speech;
            decreasing an amplitude of the first portion of the audio playback signal; and
            increasing an amplitude of the second portion of the audio playback signal.

2. The system of claim 1, wherein the attenuation amount is configured to decrease the reduced residual echo to less than a threshold.

3. The system of claim 1, wherein the attenuation amount is proportional to an energy level of the reduced residual echo.

4. The system of claim 1, wherein the attenuation amount is proportional to a sum of the squares of the acoustic echo cancellation coefficients.

5. The system of claim 1, wherein the attenuation amount is frequency dependent.

6. The system of claim 1, wherein the attenuation amount is configured to selectively attenuate frequencies of the audio playback signal based on spectral information of the near-end speech or based on acoustic properties of the speaker.

7. A method comprising:
    receiving an audio playback signal;
    receiving an audio input signal;
    performing echo cancellation on the audio input signal using the audio playback signal and a set of acoustic echo cancellation parameters to generate an echo-reduced signal, the echo-reduced signal comprising a residual echo;
    determining that near-end speech of a user is present in the audio input signal;
    determining an attenuation amount for the audio playback signal; and
    attenuating the audio playback signal based on the attenuation amount, wherein attenuating the audio playback signal comprises:
        determining spectral information corresponding to at least a portion of the audio input signal;
        determining, based at least in part on the spectral information, a portion of the audio playback signal associated with speech; and
        decreasing an amplitude of the portion of the audio playback signal associated with speech.

8. The method of claim 7, wherein the attenuation amount is configured to decrease the residual echo to less than a threshold.

9. The method of claim 7, wherein the attenuation amount is proportional to an energy level of the residual echo.

10. The method of claim 7, wherein the attenuation amount is proportional to a sum of the squares of the echo cancellation parameters.

11. The method of claim 7, wherein the attenuation amount is frequency dependent.

12. The method of claim 7, wherein the attenuation amount is configured to selectively attenuating frequencies of the audio playback signal based on spectral information of the near-end speech or based on acoustic properties of the speaker.

13. The method of claim 7, wherein echo cancellation comprises acoustic echo cancellation and residual echo suppression.

14. The method of claim 7, wherein the attenuation amount is based at least in part on at least one of the residual echo and the echo cancellation information.

15. One or more non-transitory computer-readable storage media comprising computer-executable instructions to:
    receive an audio playback signal;
    receive an audio input signal;
    process the audio input signal using a set of processing parameters to generate a processed signal;
    determine that near-end speech is present in the audio input signal;

determine an attenuation amount for the audio playback signal; and attenuate the audio playback signal based on the attenuation amount, wherein attenuating the audio playback signal comprises:

determining, based at least in part on spectral information corresponding to at least a portion of the audio input signal, a portion of the audio playback signal associated with speech; and modifying an amplitude of the portion of the audio playback signal associated with speech.

16. The one or more non-transitory computer-readable storage media of claim 15, wherein the attenuation amount is such that the residual echo is less than a threshold.

17. The one or more non-transitory computer-readable storage media of claim 15, wherein the attenuation amount is proportional to an energy level of the residual echo.

18. The one or more non-transitory computer-readable storage media of claim 15, wherein the attenuation amount is proportional to a sum of the squares of the processing parameters.

19. The one or more non-transitory computer-readable storage media of claim 15, wherein the attenuation amount is frequency dependent.

20. The one or more non-transitory computer-readable storage media of claim 15, wherein the attenuation amount is configured to selectively attenuate frequencies of the audio playback signal based on spectral information of the near-end speech or based on acoustic properties of the speaker.

21. The one or more non-transitory computer-readable storage media of claim 15, wherein echo cancellation comprises acoustic echo cancellation and residual echo suppression.

22. The one or more non-transitory computer-readable storage media of claim 15, wherein the attenuation amount is based at least in part on at least one of the set of processing parameters.

23. The method of claim 7, further comprising determining an acoustic profile associated with the user, the acoustic profile comprising spectral information associated with speech of the user, wherein determining the portion of the audio playback signal associated with speech comprises determining the portion of the audio playback signal associated with speech based at least in part on the acoustic profile for the user.

24. The method of claim 7, further comprising determining an acoustic profile associated with a plurality of users, the acoustic profile comprising spectral information associated with speech of the plurality of users, wherein determining the portion of the audio playback signal associated with speech comprises determining the portion of the audio playback signal associated with speech based at least in part on the acoustic profile for the plurality of users.

* * * * *